(12) United States Patent
Jitkoff et al.

(10) Patent No.: US 8,176,435 B1
(45) Date of Patent: May 8, 2012

(54) PINCH TO ADJUST

(75) Inventors: Nicholas Jitkoff, Palo Alto, CA (US); Roma Shah, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/228,157

(22) Filed: Sep. 8, 2011

(51) Int. Cl.
*G06F 3/048* (2006.01)

(52) U.S. Cl. ......... 715/788; 715/701; 715/702; 715/786

(58) Field of Classification Search ............... 715/701, 715/702, 707–713, 786, 784, 788; 345/173, 345/169
See application file for complete search history.

(56) References Cited

U.S. PATENT DOCUMENTS

| | | | | |
|---|---|---|---|---|
| 5,684,969 | A * | 11/1997 | Ishida | 715/800 |
| 7,479,949 | B2 * | 1/2009 | Jobs et al. | 345/173 |
| 2008/0174570 | A1 * | 7/2008 | Jobs et al. | 345/173 |
| 2009/0141046 | A1 * | 6/2009 | Rathnam et al. | 345/661 |
| 2009/0213083 | A1 * | 8/2009 | Dicker et al. | 345/173 |
| 2010/0162165 | A1 * | 6/2010 | Addala et al. | 715/810 |
| 2011/0072394 | A1 | 3/2011 | Victor | |
| 2011/0074824 | A1 | 3/2011 | Srinivasan et al. | |
| 2011/0142016 | A1 * | 6/2011 | Chatterjee | 370/338 |
| 2011/0164029 | A1 * | 7/2011 | King et al. | 345/419 |
| 2011/0193788 | A1 * | 8/2011 | King et al. | 345/173 |

* cited by examiner

*Primary Examiner* — Simon Ke
(74) *Attorney, Agent, or Firm* — Sterne, Kessler, Goldstein & Fox, P.L.L.C.

(57) ABSTRACT

Methods and systems for resizing a display area of a display device are disclosed. An example method may include receiving an on-screen pinch gesture associated with a first location and a second location, the second location being different from the first location on a multi-touch input device. The method may also include for each of a plurality of predefined content areas: adjusting a respective size of each predefined content area based on the on-screen pinch gesture, determining a respective amount of the content to display in the predefined content area based on the respective adjusted size of the predefined content area, and displaying the respective adjusted amount of content within the respective predefined content area associated with the adjusted size on the multi-touch input device.

22 Claims, 6 Drawing Sheets

PINCH TO ADJUST

BACKGROUND

1. Technical Field

The field relates to operating systems, software applications and user interface devices, and, more particularly, to a system, method, apparatus or non-transitory computer program product of receiving a pinch gesture input and autonomously modifying a viewable content area of a multi-touch input display device.

2. Background

Touch screens are commonly used with computer displays, smartphones, tablet computing devices, personal digital assistants (PDAs) and other computational devices. The touch screen allows a user to input commands, browse content, change and customize display viewing options, and enable and disable a variety of different computing device features. In general, a touch screen display device provides a user interface display coupled to a touch-sensitive surface overlay.

In one example of using a touch screen device, a user may access a web page from the Internet and download text and/or images to a smartphone device by using his or her fingers to navigate the corresponding commands on the touch screen device. When accessing the web page, the user may select a particular desktop icon, such as a browser, and launch a particular application simply by pressing his or her finger against the surface of the touch screen display device.

More advanced touch features may include touching a particular touch display device and holding it for a particular amount of time to change from a first input state to another input state. For example, a first instance of touching may be interpreted by the operating system as a selection operation. A different instance may provide touching the display device for a predetermined amount of time, which may be interpreted as a drag-and-drop operation used to move an icon across a desktop or home screen. Still another advanced touch feature may include browsing content by expanding and contracting viewable areas of content displayed on a display device.

However, the above-noted touching operations and advanced touching operations are unrefined and lack simplicity. Touch screen interfaces must provide optimum user satisfaction, and the limited viewing space on the newer pocket and travel-sized display devices requires increasingly simple and prompt viewing options for the users' satisfaction.

BRIEF SUMMARY

One innovative aspect of the subject matter described in this specification is embodied in methods that include receiving an on-screen pinch gesture associated with a first location and a second location, the second location being different from the first location on a multi-touch input device. The method may also include for each of a plurality of predefined content areas: adjusting a respective size of each predefined content area based on the on-screen pinch gesture, determining a respective amount of the content to display in the predefined content area based on the respective adjusted size of the predefined content area, and displaying the respective adjusted amount of content within the respective predefined content area associated with the adjusted size on the multi-touch input device.

One innovative aspect of the subject matter described in this specification is embodied in systems that include an on-screen input device configured to: receive an on-screen pinch gesture associated with a first location and a second location, the second location being different from the first location on a multi-touch input device; and a content area adjustor, implemented with a computing device, configured to, for each of a plurality of predefined content areas: adjust a respective size of each predefined content area based on the on-screen pinch gesture; determine a respective amount of the content to display in the predefined content area based on the respective adjusted size of the predefined content area; and display the respective adjusted amount of content within the respective predefined content area associated with the adjusted size on the multi-touch input device.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
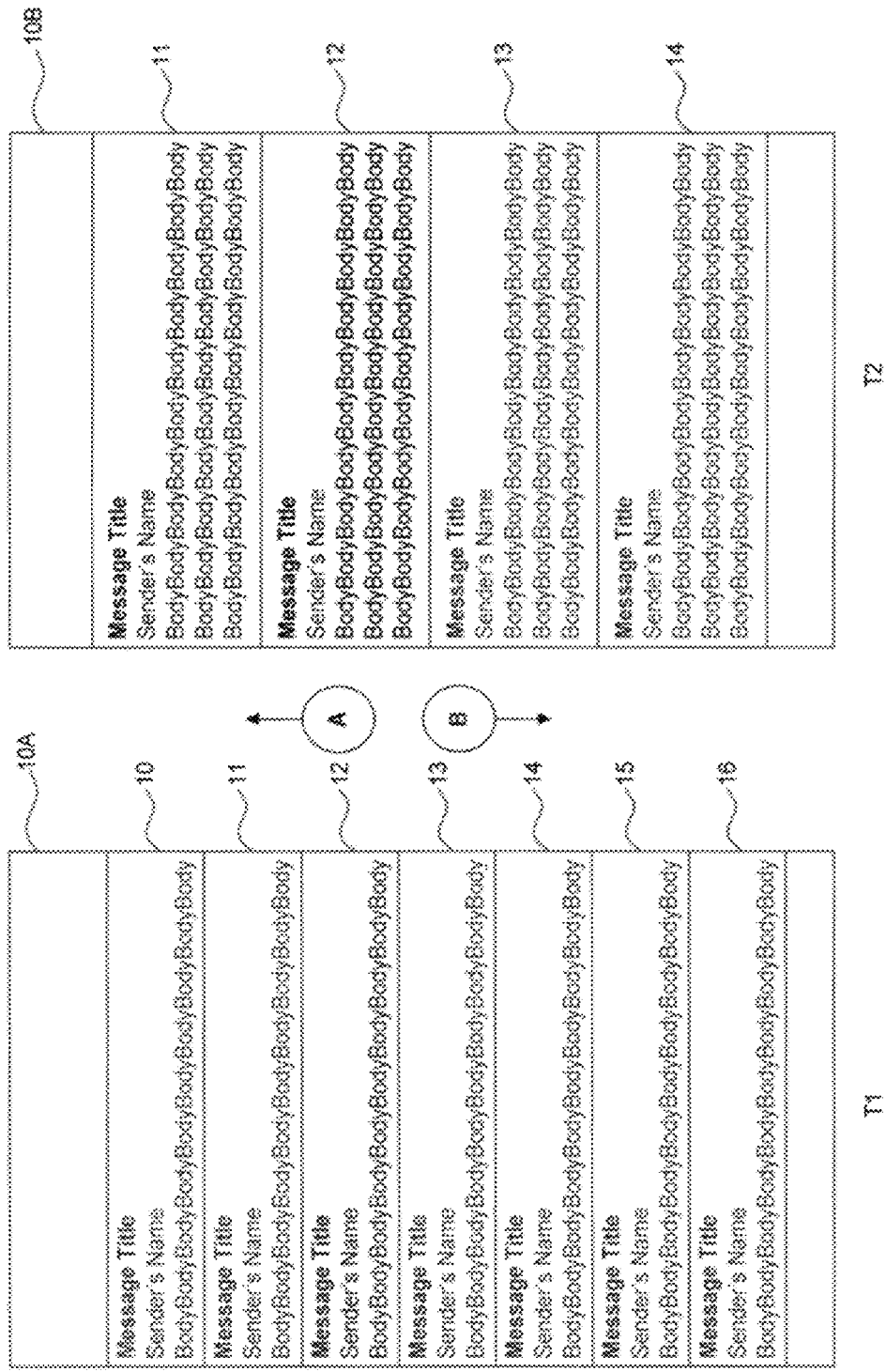
FIG. 1A is an illustration of an example display view transformation before and after performing a pinching operation, according to an example embodiment.

Embodiments described herein refer to illustrations for particular application. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Touch screen devices generally provide a touch-sensitive screen that overlays a display monitor or screen. Conventional touch screens often include a layer of capacitive material and may be based on a two-dimensional coordinate grid (X-axis, Y-axis). The areas that are touched create a voltage, which is detected as being at a particular location on the coordinate grid. More advanced touch screen systems may be able to process multiple simultaneous touch signals at different locations on the coordinate grid. Specific examples of touch screen materials may include mutual capacitance, which utilizes two distinct layers of material for sensing touch and driving a voltage or current. Another example is self-capacitance, which uses one layer of individual electrodes connected to capacitance-sensing circuitry. The examples of underlying touch screen technology are for example purposes only and will be omitted from further discussion.

The processor and associated operating system will interpret the received touch input and execute a corresponding application and/or provide a particular result. For example, when a user touches a touch screen surface, the capacitive material sends touch-location data to the processor. The processor uses software stored in the memory to interpret the data as commands and gestures. Input received from the touch screen is sent to the processor as electrical impulses. The processor uses software to analyze the data and determine the characteristics of each touch, such as the size, shape and location of the touched area on the display touch screen.

Interpretation software may be used to identify the type of gesture. For example, a pinching gesture made with two or more fingers may be used to enlarge or reduce the size of viewable content of a display screen. Pinching may be used to adjust the size (height or width) of content areas. A pinch may be a finger movement that includes moving two fingers in a direction towards one another. Alternatively, one finger may be used to simulate a pinching motion, or more than two fingers may also be used. A pinching motion or movement may be performed by placing, for example, two fingers at two separate locations on the multi-touch display device and dragging them towards each other without moving them off the surface of the multi-touch display device.

FIG. 1A is an illustration of an example display view transformation before and after performing a pinching operation, according to an embodiment. The content area(s) of the multi-touch display device may be organized into a plurality of rows representing separate sections of a display area. Pinching may be performed by using two fingers to increase or decrease the targeted viewable section of the display. For example, a user may begin by placing the thumb and index finger, or any other variation of fingers, on the display. The placement may be any distance apart, however, in order to perform an effective pinching operation, the fingers should be some appreciable distance apart, such as 1 centimeter (cm) or more. In this example, the user may place one finger at point "A" and another finger at point "B" on the display area 10A. Although the position of points "A" and "B" are illustrated as being off the display area 10A, generally, the user would place their fingers on the display area directly.

Display area 10A provides a view of seven different rows of content at a first time T1 prior to user manipulation. The rows may be predefined sizes of content created by the application and executed by the operating system to provide an aesthetic viewing experience for the user. In this example, rows 10, 11, 12, 13, 14, 15 and 16 are seven rows each containing a certain amount of viewable content. The content of rows 10-16 are filled with text, which may be, for example, snippets or portions of a user's emails currently stored in their inbox. The user may execute a mail application on their computing device (smartphone, PDA, tablet, personal computer, laptop, etc.), and, as a result, the list of messages 10-16 may be displayed to occupy the display area of the computing device.

Upon placing the user's fingers into positions "A" and "B" and moving the fingers across the surface of the display in a vertical direction (as indicated by the arrows), a readjustment procedure may be performed to yield a new display view 10B. The user has indicated to the display device that the area closest to positions "A" and "B" is of interest to the user and should be expanded. The expanded view provides a complete readjustment to the predefined row size of viewable content. Display view 10B has all of its content area occupied by larger rows providing more content associated with the area pinched by the user. In other words, the pinching operation performed near rows 12 and 13 has resulted in a new display view 10B that centers the display area around the area pinched and automatically resizes the nearest content areas to create a respective adjusted content area based on the content areas of interest. The content illustrated in FIG. 1A is all text, but, the content may also be pictures, video, and any other related content types.

The pinching operation effectively expanded the rows. For instance, before the pinching operation, seven rows of content 10-16 divided the viewable area of display 10A evenly. After the pinching near or adjacent to the rows of interest (rows 12 and 13), the row expansion operation ensured that the expansion began with rows 12 and 13 and allowed for additional rows 11 and 14, respectively, in display area 10B. Reverse pinching to horizontally increase the distance of the rows effectively extended the user's view of the row. Rather than zooming in on the text to magnify the content, the predefined content areas expanded by increasing the content areas height to provide more content for a given content field or snippet of content. Similar modifications may be made in the horizontal direction to widen a column area (not shown). Increasing the content areas may be performed by manipulating the display via a variety of different touching operations. The area of interest or the section of text, image or group of text or images may become enlarged to provide a wider, taller and/or overall larger view of the area of interest.

Performing a pinching or reverse pinching operation may expand all of the rows or just one. Generally, all of the rows will be modified as a result of the pinching operation. The row resizing may be saved and applied as a new standard for viewing content. The resize may instead be a one-time modification, a permanent, semi-permanent or one-time modification. The modification may be reset after the device is reset, powered-off or is left idle a predetermined amount of time. The pinching may simultaneously adjust the width and height regardless of the pinching direction (horizontal or vertical). This would also apply to non-touch display devices, such as, a touch pad peripheral control device coupled to a non-touch display device. The content may be text, images, video, multimedia plug-ins, such as, macromedia, flash, and may be compatible with HTML5 tags, <video>, <audio>, etc.

Figure 1B:
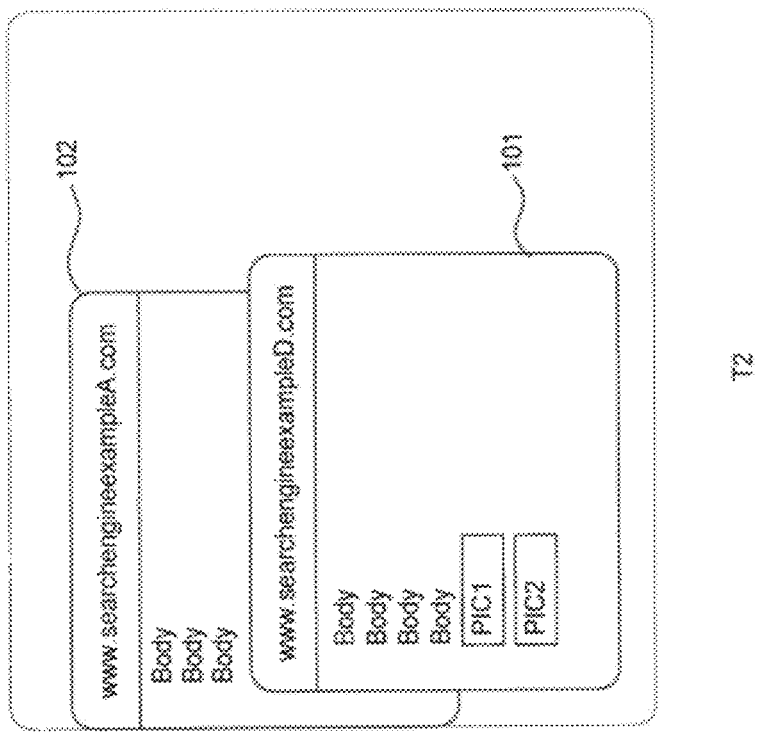
FIG. 1B is an illustration of another example display view transformation before and after performing a pinching operation, according to an example embodiment.
Figure 1B:
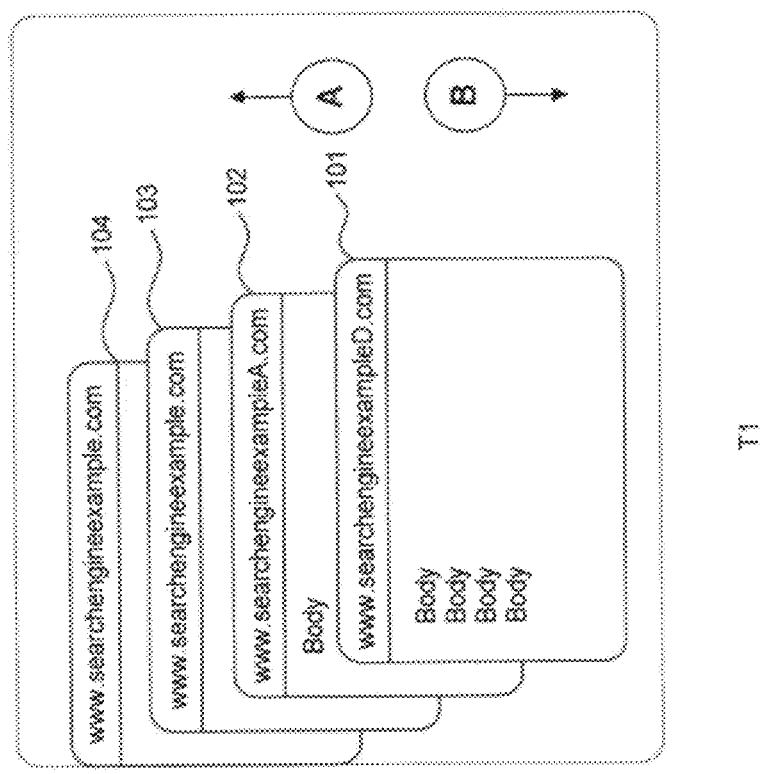

FIG. 1B is an illustration of another example display view transformation before and after performing a pinching operation at a later time T2, according to an embodiment. Website browser windows, "thumbnails" or "cards" 101, 102, 103 and 104 are illustrated as being stacked on top of each other in a viewable configuration. As illustrated in FIG. 1B, the content areas are somewhat viewable, with the website address being visible at the top, while the last accessed cards 101 and 102 are displaying the most viewable content, indicated by the sample "Body" indicators displayed. The visible content of the cards of interest may be expanded via a pinching operation similar to that described above with respect to FIG. 1A.

The thumbnail-sized cards 101-104, with the exception of card 101, are generally only a quarter exposed to the user of the display.

The pinching operation is illustrated as being performed near cards 101 and 102 by increasing the horizontal distance between the original pinch positions "A" and "B." This pinching operation may result in providing a larger viewable portion of the cards nearest the pinch movement, as detected by the multi-touch input device of the display device. The result of the pinching operation is provided at a later time T2 after the pinching operation. The new display view includes fewer cards 101 and 102, however, as may be observed from FIG. 1B, the content of the cards has been expanded to include more visible content. The size of the cards may be expanded as well to offer a more comprehensive preview of the user's indicated content area of interest. In some cases, the pinching may adjust the headers of the cards.

Figure 2:
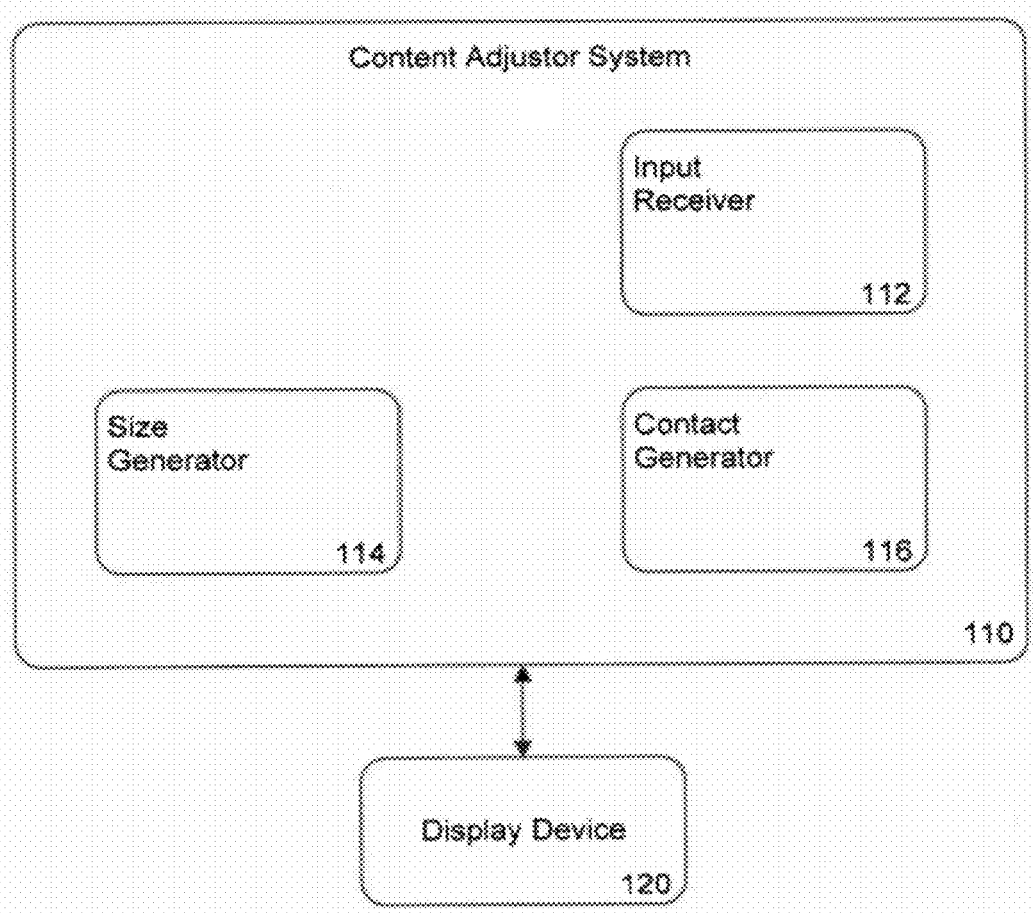
FIG. 2 is an illustration of a content adjustor system, according to an example embodiment.

FIG. 2 is a block diagram of an exemplary system 110 configured to perform a pinching expansion operation, according to an embodiment. System 110, or any combination of its components, may be part of or may be implemented with a computing device. Examples of computing devices include, but are not limited to, a computer, workstation, distributed computing system, computer cluster, embedded system, stand alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 110 may include an input receiver 112, a size generator component 114, and a contact generator 116. The system 110 is in communication with a display device 120, which may be used to display any of the example display configurations discussed in detail above. Examples of the embodiments for exemplary system 110 or subsystem components, such as input receiver 112, size generator 114, and/or contact generator 116, and methods or any parts or function(s) thereof may be implemented using hardware, software modules, firmware, tangible computer readable or computer usable storage media having instructions stored thereon, or a combination thereof and may be implemented in one or more computer systems or other processing systems.

In operation, the multi-touch input device or display device 120 may receive a user input pinching gesture. The user input may be received and transferred from the display device 120 to the content adjustor system 110, which uses a processor and operating system to perform computations necessary to enlarge the viewable content area of the display so more content is available based on the selection performed by the user. The subsystem components, such as, the input receiver 112, size generator 114, and/or contact generator 116 may perform computational functions related to the operation of the processor and operation system to produce the enlarged content area output, as, for example, the embodiments described above.

Figure 3:
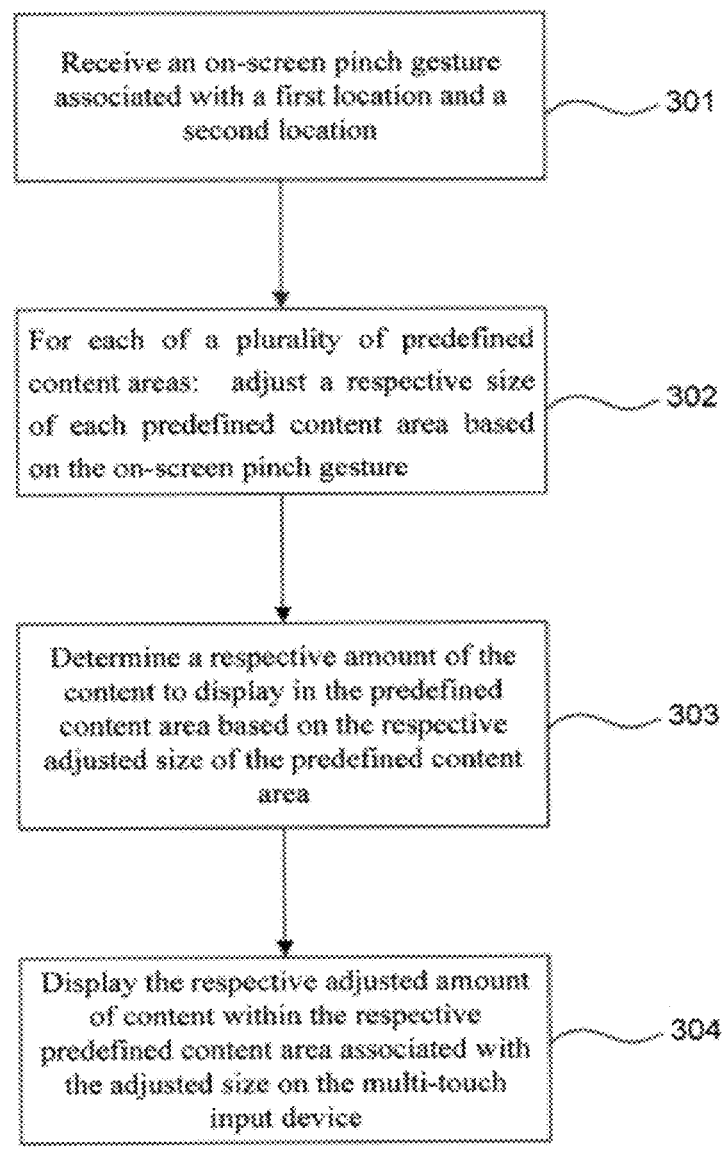
FIG. 3 is an illustration of a flow diagram of an example method of operation, according to an example embodiment.

FIG. 3 is an illustration of a flow diagram of an example method of operation, according to an example embodiment.

Referring to FIG. 3, the method may include receiving an on-screen pinch gesture associated with a first location and a second location, the second location being different from the first location on a multi-touch input device, at operation 301. The method may also include for each of a plurality of predefined content areas, adjusting a respective size of each predefined content area based on the on-screen pinch gesture, at operation 302. The method may further include determining a respective amount of the content to display in the predefined content area based on the respective adjusted size of the predefined content area, at operation 303, and displaying the respective adjusted amount of content within the respective predefined content area associated with the adjusted size on the multi-touch input device, at operation 304. According to one embodiment, operations 301-304 may be performed by system 110 with the assistance of display device 120.

In one embodiment, the on-screen pinch gesture is one of a horizontal on-screen pinch gesture or a vertical on-screen pinch gesture. Each of the plurality of predefined content areas may be a row or a header. The content may be text or images.

In one embodiment, receiving an on-screen pinch gesture associated with a first location and a second location may include receiving a horizontal distance increasing on-screen pinch gesture. Adjusting a respective size of each predefined content area based on the on-screen pinch gesture may include increasing the respective size of each predefined content area based on the horizontal distance.

In one embodiment, the plurality of predefined content areas are a plurality of cards, each associated with a respective browser window. Adjusting a respective size of each predefined content area based on the on-screen pinch gesture, can include adjusting the size of each respective browser window, and adjusting a number of the respective browser windows based on the adjusting of the size.

Figure 4A:
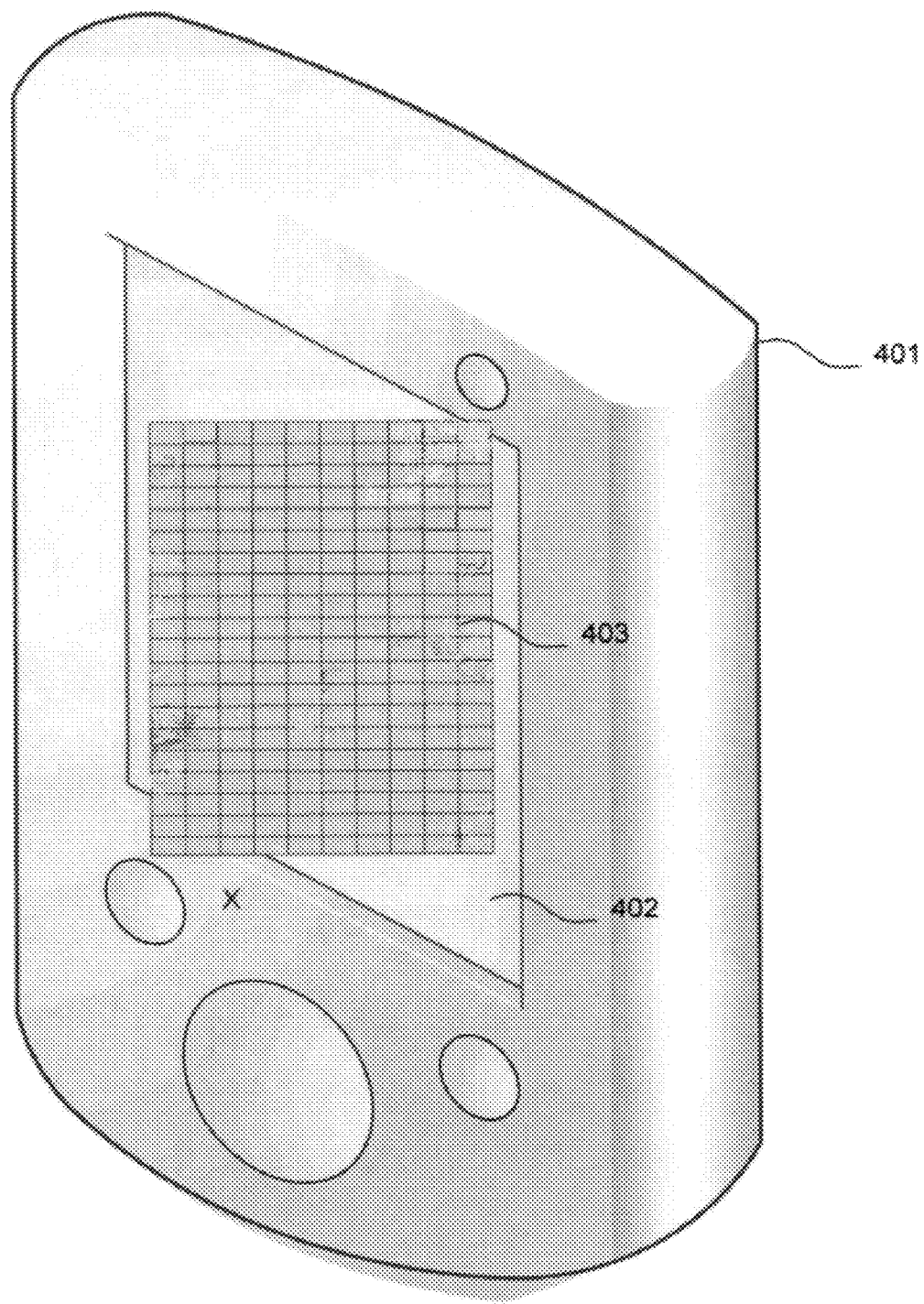
FIG. 4A illustrates an example computing device with an exploded view of the touch screen display grid, according to an example embodiment.

FIG. 4A illustrates an example computing device, according to an example embodiment. Referring to FIG. 4A, the computing device 401, such as a smartphone, tablet computer, etc., may include a touch screen 402 that accepts user input via touching operations performed by a user's fingers or other instrument. For example purposes, a touch sensor grid 403 is illustrated in an exploded view of the touch screen 402 with a touch sensor grid 403 overlaying the display area. The touch sensor grid contains many touch sensitive areas or cells which may be used to locate the area closest to the input of a user's touch.

Figure 4B:
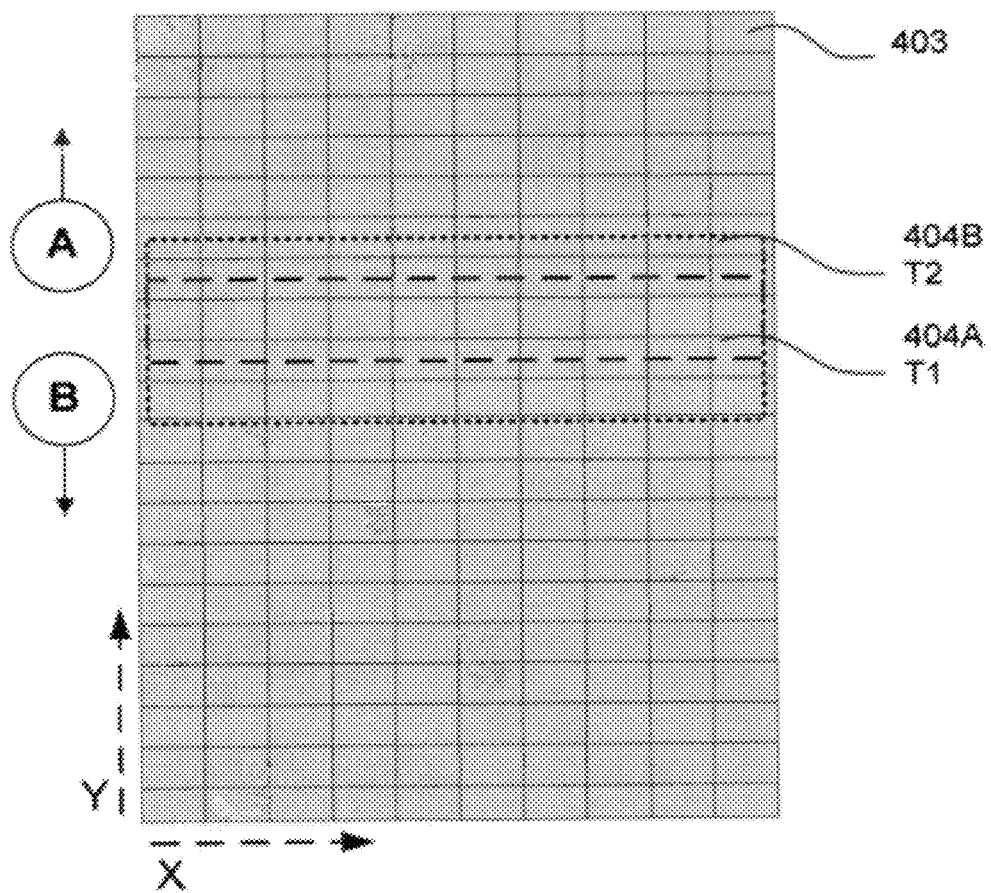
FIG. 4B illustrates an example of the touch screen display grid and content display areas, according to an example embodiment.

FIG. 4B illustrates an example of the touch sensor grid 403 in greater detail. The grid is shown has having a two-dimensional touch surface as denoted by the X and Y axes. The original size of a row of content area 404A at a first time T1 is illustrated by the dashed line. The size of the row of content area 404A occupies approximately one full cell and two half cells, as indicated by the surface area of the dashed line. After the user has expanded the targeted viewing area of the display, by pinching to expand the view, the size of the content area will shift to a larger content area 404B at time T2, as indicated by the dotted line. The system 110 will interpret the user's pinching operation as an enlarging operation that effectively increases the size of the row of viewable content. The new larger content area 404B occupies more cells than the original content area 404A.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
    displaying, on a multi-touch input device, a plurality of content areas for an email messaging system, each content area associated with a respective first amount of text, wherein each of the plurality of content areas is displayed with a respective initial viewable amount of text that is a subset of the respective first amount of text;
    receiving an on-screen pinch gesture for expanding a size of each of the content areas, the on-screen pinch gesture being associated with a first location and a second location, the second location being different from the first location on the multi-touch input device; and
    for each of the plurality of content areas:
        expanding a respective size of the respective content area based on the on-screen pinch gesture; and
        displaying an increased viewable amount of text in the respective expanded content area based on the expanded size of the content area, wherein the increased viewable amount of text is a larger subset of the respective first amount of text than the initial viewable amount of text, and a character size of the increased viewable amount of text is substantially equal to a character size of the original viewable amount of text.

2. The method of claim 1, wherein the on-screen pinch gesture is one of a horizontal on-screen pinch gesture or a vertical on-screen pinch gesture.

3. The method of claim 1, wherein each of the plurality of content areas is a row.

4. The method of claim 1, wherein each of the plurality of content areas is a header.

5. The method of claim 1, wherein content in the content areas includes one or more images.

6. The method of claim 1, wherein receiving an on-screen pinch gesture associated with a first location and a second location comprises:
    receiving a horizontal distance increasing on-screen pinch gesture.

7. The method of claim 6, wherein expanding the respective size of the respective content area based on the on-screen pinch gesture further comprises:
    expanding the respective size of the respective content area based on the horizontal distance.

8. The method of claim 1, wherein the plurality of content areas is a plurality of cards, each card associated with a respective browser window, and wherein expanding the respective size of the respective content area based on the on-screen pinch gesture comprises:
    expanding the size of each respective browser window; and
    reducing a number of the respective browser windows based on the expanding of the size.

9. A system, comprising:
    an on-screen input device, configured to:
    display a plurality of content areas for an email messaging system, each content area associated with a respective first amount of text, wherein each of the plurality of content areas is displayed with a respective initial viewable amount of text that is a subset of the respective first amount of text;
    receive an on-screen pinch gesture for expanding a size of each of the content areas, the on-screen pinch gesture being associated with a first location and a second location, the second location being different from the first location on the on-screen input device; and
    a content area adjustor, implemented with a computing device, configured to, for each of the plurality of content areas:
        expand a respective size of the respective content area based on the on-screen pinch gesture; and
        displaying an increased viewable amount of text displayed in the respective expanded content area based on the expanded size of the respective content area, wherein the increased viewable amount of text is a larger subset of the respective first amount of text than the initial viewable amount of text, and a character size of the increased viewable amount of text is substantially equal to a character size of the original viewable amount of text.

10. The system of claim 9, wherein the on-screen pinch gesture is one of a horizontal on-screen pinch gesture or a vertical on-screen pinch gesture.

11. The system of claim 9, wherein each of the plurality of content areas is a row.

12. The system of claim 9, wherein each of the plurality of content areas is a header.

13. The system of claim 9, wherein content in the content areas includes one or more images.

14. The system of claim 9, wherein the content area adjustor is further configured to:
    receive a horizontal distance increasing on-screen pinch gesture.

15. The system of claim 14, wherein the content area adjustor is further configured to:
    increase the respective size of each content area based on the horizontal distance.

16. The system of claim 9, wherein the plurality of content areas is a plurality of cards, each card associated with a respective browser window, and the content area adjustor is further configured to:
    expand the size of each respective browser window; and
    reduce a number of the respective browser windows based on the expanding of the size.

17. The method of claim 1, wherein expanding a respective size of the respective content area comprises:
    expanding a respective size of the respective content area without expanding a size of the text in the content area.

18. The method of claim 1, wherein displaying the plurality of content areas comprises:
    displaying a first portion of the plurality of content areas, wherein a second portion of the plurality of content areas is not displayed, and
    wherein the method further comprises, based on the on-screen pinch gesture, reducing a number of content areas in the displayed first portion of the plurality of content areas.

19. The method of claim 1, wherein displaying the plurality of content areas comprises:
    displaying the plurality of content areas each having an email displayed.

20. The method of claim 1, wherein displaying the plurality of content areas comprises:
    for each content area, displaying a first preview of the respective first amount of text in the respective content area, and
    wherein increasing the viewable amount of text displayed in the respective expanded content area based on the expanded size of the content area comprises:
    displaying a second preview in the respective expanded content area based on the expanded size of the content area,
    wherein the second preview displays a larger subset of the respective first amount of text than the first preview.

21. The method of claim 1, wherein displaying the plurality of content areas comprises:
    displaying the plurality of content areas each having a web browser displayed.

22. The method of claim 1, wherein displaying the plurality of content areas comprises:
    displaying the plurality of content areas each having an email folder displayed.

* * * * *